(12) United States Patent
Wendt et al.

(10) Patent No.: US 9,819,183 B2
(45) Date of Patent: Nov. 14, 2017

(54) POWER DISTRIBUTION SYSTEM

(71) Applicant: PHILIPS LIGHTING HOLDING B.V., Eindhoven (NL)

(72) Inventors: Matthias Wendt, Würselen (DE); Bob Bernardus Anthonius Theunissen, Zaltbommel (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/905,867

(22) PCT Filed: Jul. 18, 2014

(86) PCT No.: PCT/EP2014/065511
§ 371 (c)(1),
(2) Date: Jan. 18, 2016

(87) PCT Pub. No.: WO2015/007886
PCT Pub. Date: Jan. 22, 2015

(65) Prior Publication Data
US 2016/0190807 A1 Jun. 30, 2016

(30) Foreign Application Priority Data
Jul. 18, 2013 (EP) .................................... 13176987

(51) Int. Cl.
*H01H 35/14* (2006.01)
*H02J 3/00* (2006.01)
*H05B 37/02* (2006.01)

(52) U.S. Cl.
CPC .............. *H02J 3/005* (2013.01); *H05B 37/02* (2013.01)

(58) Field of Classification Search
CPC .... H02J 3/005–3/006; H02J 3/12; H02J 3/14; H02J 9/00; H02J 9/04; H02J 9/06; H02J 9/065
(Continued)

(56) References Cited

U.S. PATENT DOCUMENTS 4,851,740 A 7/1989 Targetti
5,038,005 A 8/1991 Hohorst et al.
(Continued)

FOREIGN PATENT DOCUMENTS

KR 20120036672 A 4/2012
WO 9734352 A1 9/1997
(Continued)

*Primary Examiner* — Jason M Crawford
(74) *Attorney, Agent, or Firm* — Meenakshy Chakravorty

(57) ABSTRACT

The invention relates a power distribution system (1) like a track lighting system comprising a power supply (2), a power bar (3) comprising several electrical conductors (4, 5, 6) for distributing the power, an electrical load (12) to be powered by the power of the power distribution system, a selector switch (11) connected to the several electrical conductors and to the electrical load, wherein the selector switch is adapted to select via which electrical conductor the power is to be received by the electrical load, and a controlling device (10) for automatically controlling the selector switch. This kind of power distribution system provides a relatively large variability of adapting the power consumption to an actual load situation, which can lead to an improved performance of the power distribution system. In particular, power balancing can be provided in a relatively simple way by automatically controlling the selector switch accordingly.

19 Claims, 3 Drawing Sheets

(58) Field of Classification Search
USPC .............. 315/160–161, 291, 294, 297, 307;
307/112–113, 115–117, 125–126,
307/139–140; 361/600–601, 605, 622,
361/631
See application file for complete search history.

(56) References Cited

U.S. PATENT DOCUMENTS

| | | | |
|---|---|---|---|
| 5,072,216 A | 12/1991 | Grange | |
| 8,200,990 B2* | 6/2012 | Dishman | G06F 1/26 713/300 |
| 9,342,414 B1* | 5/2016 | Nguyen | G06F 11/2015 |
| 2003/0048005 A1 | 3/2003 | Goldin et al. | |
| 2003/0197431 A1* | 10/2003 | Lathrop | H02J 9/08 307/125 |
| 2006/0028069 A1* | 2/2006 | Loucks | H02J 3/005 307/130 |
| 2007/0018506 A1* | 1/2007 | Paik | H02J 9/06 307/115 |
| 2008/0137266 A1* | 6/2008 | Jensen | H02B 1/21 361/602 |
| 2008/0155915 A1 | 7/2008 | Howe et al. | |
| 2008/0302033 A1 | 12/2008 | Insalaco et al. | |
| 2009/0212630 A1* | 8/2009 | Flegel | H02J 9/06 307/64 |
| 2010/0134341 A1 | 6/2010 | Priest | |
| 2011/0181125 A1* | 7/2011 | Diab | G06F 1/1632 307/116 |
| 2012/0109553 A1* | 5/2012 | Hancock | G01R 31/42 702/62 |
| 2013/0002166 A1 | 1/2013 | Meyer | |
| 2014/0208130 A1* | 7/2014 | Morales | G06F 1/30 713/300 |
| 2015/0234440 A1* | 8/2015 | Gardner | G06F 11/2015 713/300 |

FOREIGN PATENT DOCUMENTS

| | | |
|---|---|---|
| WO | 2007038752 A2 | 4/2007 |
| WO | 2012057549 A2 | 5/2012 |
| WO | 2013128382 A1 | 9/2013 |

* cited by examiner

POWER DISTRIBUTION SYSTEM

CROSS-REFERENCE TO PRIOR APPLICATIONS

This application is the U.S. National Phase application under 35 U.S.C. §371 of International Application No. PCT/EP2014/065511, filed on Jul. 18, 2014, which claims the benefit of European Patent Application No. 13176987.9, filed on Jul. 18, 2013. These applications are hereby incorporated by reference herein.

FIELD OF THE INVENTION

The invention relates to a power distribution system, a power distribution method for operating the power distribution system and an electrical device for being used in the power distribution system. The invention relates further to a controlling computer program for controlling the power distribution system.

BACKGROUND OF THE INVENTION

Known power distribution systems comprise a power supply, electrical conductors like power bars or electrical cables for distributing the supplied power and one or several electrical devices connected to the electrical conductors for consuming the supplied power. If too much power is consumed, an overload situation may occur, which may lead to a shut down of the power distribution system. This susceptibility for overload situations reduces the performance of the power distribution system.

SUMMARY OF THE INVENTION

It is an object of the present invention to provide a power distribution system, a power distribution method for operating the power distribution system and a controlling computer program for controlling the power distribution system, which allow for an improved performance of the power distribution system. It is a further object of the present invention to provide an electrical device for being used in the power distribution system.

In a first aspect of the present invention a power distribution system is presented, wherein the power distribution system comprises:
a power supply for supplying power,
a power bar comprising several electrical conductors for distributing the power,
an electrical load to be powered by the power of the power distribution system,
a selector switch connected to the several electrical conductors of the power bar and to the electrical load, wherein the selector switch is adapted to select via which electrical conductor of the power bar the power is to be received by the electrical load, and
a controlling device for automatically controlling the selector switch.

Since the power distribution system comprises several electrical conductors for distributing the power, wherein the selector switch, which is automatically controlled by the controlling device, is connected to the several electrical conductors and to the electrical load and is adapted to select via which electrical conductor the power is to be received by the electrical load, the power distribution system provides a relatively large variability of adapting the power consumption to an actual load situation, which can lead to an improved performance of the power distribution system.

The power distribution system may comprise one or several power bars, wherein each power bar comprises the several electrical conductors for distributing the power. The power bar can also be regarded as being a bus bar or power track. It preferentially comprises the several electrical conductors and a carrying element for carrying the electrical conductors. The carrying element is preferentially an elongated track like element. The several electrical conductors are preferentially metallic conductors like copper conductors. The electrical load is preferentially a light source such that the power distribution system may be regarded as being a lighting system. The power distribution system may comprise several electrical loads, in particular, several light sources and/or other electrical loads like sensors, fans, et cetera.

It is preferred that the system further comprises an electrical conductor power consumption determination unit for determining the power actually consumed on each electrical conductor, wherein the controlling device is adapted to select the electrical conductor, via which the power is to be received by the electrical load, based on the determined actual power consumptions on the electrical conductors. In particular, the controlling device can be adapted to select the electrical conductor on which the determined actual power consumption is the lowest. Thus, the power distribution system can be adapted to provide a power balancing such that the performance of the power distribution system is further improved.

It is further preferred that the system further comprises an electrical load power consumption determination unit for determining the actual power consumption of the electrical load, wherein the controlling device is adapted to select an electrical conductor depending on the actual power consumption of the electrical load and the actual power consumption on the different electrical conductors. By also considering the actual power consumption of the electrical load while controlling the selector switch the power balancing and thus the performance of the power distribution system can be further improved. For instance, the controlling device can be adapted to automatically control the selector switch such that the electrical conductor is selected, which actually allows providing at least the actual power consumption of the electrical load.

It is also preferred that the system comprises an input unit allowing a user to modify the actual power consumption of the electrical load. For instance, the input unit can be adapted to allow a user to remotely modify the actual power consumption of the electrical load. If the electrical load is a light source, the input unit may be adapted to allow the user to remotely set the dim level of the light source and/or to remotely switch the light source on or off, thereby modifying the actual power consumption of the light source.

In an embodiment the controlling device is adapted to be remotely controllable by a user, in order to allow the user to select a certain electrical conductor via which the power should be received by the electrical load. Thus, in an embodiment a user can remotely, manually and directly select a certain electrical conductor via which the power should be received by the electrical load in accordance with the user's preferences. This can be used, for instance, to group several electrical loads by selecting for these electrical loads the same electrical conductor, if the power distribution system comprises several electrical loads. The electrical loads of a same group, i.e. for which the same electrical conductor has been selected, may then be jointly controlled via the selected electrical conductor. The controlling device may interact with a remote input unit, wherein the user may be allowed to input the selected electrical conductor by using the input unit and wherein an indication being indicative of the selected electrical conductor may be sent to the controlling device for allowing the controlling device to control the selector switch accordingly. The controlling device may be operable in at least two modes, in a first mode, in which the selector switch is automatically controlled, and in a second mode, in which the selector switch is manually controlled by a user by remotely controlling the controlling device. The controlling device may further be adapted to allow the user to select one of these modes, for instance, via the remote input unit.

Preferentially, at least one of the electrical conductors is an emergency electrical conductor to be powered in an emergency situation, wherein the system further comprises an emergency signal providing unit for providing an emergency signal in case of an emergency, wherein the controlling device is adapted to select the emergency electrical conductor for powering the electrical load, if the emergency signal providing unit has provided the emergency signal. This ensures that also in an emergency situation the electrical load will be powered. For instance, if the power distribution system comprises several light sources, at least the selector switch of some light sources can be controlled to select the emergency electrical conductor for powering the respective light source, if the emergency signal providing unit has provided the emergency signal, in order to ensure an emergency lighting in an emergency situation.

The emergency signal providing unit may be adapted to automatically detect an emergency situation, for instance, by automatically detecting a fire or another emergency situation by using corresponding sensors like temperature sensors including infrared cameras. Alternatively or in addition, the emergency signal providing unit may be adapted to be actuatable by a person for allowing the person to generate the emergency signal.

The system may also comprise a power measuring unit for measuring the power on the electrical conductor via which the electrical load actually receives the power, wherein the controlling device is adapted to select another electrical conductor, if the measured power is smaller than a predefined threshold. Thus, if the power on the electrical conductor, via which the electrical load actually receives the power, is relatively small, the electrical load can automatically be connected to another electrical conductor. The predefined threshold can correspond to the power actually needed by the electrical load such that, if the power required by the electrical load cannot be received via the electrical conductor which actually powers the electrical load, the electrical load can be connected to another electrical conductor providing more power. Thus, also in this way a power balancing can be realized by switching over between different electrical conductors.

The system can be adapted to provide AC power via the several conductors, wherein at least two different electrical conductors each carry single phase AC power. In particular, the system may comprise a neutral electrical conductor, a ground electrical conductor and at least two phase electrical conductors, wherein each phase electrical conductor carries single phase AC power, wherein the neutral electrical conductor and the ground electrical conductor are electrically connected to the electrical load and the phase electrical conductors are electrically connected to the selector switch, wherein the selector switch is adapted to select via which phase electrical conductor the power is to be received by the electrical load. In another embodiment the power distribution system can be adapted to provide three-phase electric power as the AC power via the several conductors, wherein three electrical conductors carry three different phases of the provided three-phase electric AC power. For instance, the system can comprise a neutral electrical conductor, a ground electrical conductor and three phase electrical conductors carrying different phases of the AC power, wherein the neutral electrical conductor and the ground electrical conductor are electrically connected to the electrical load and the phase electrical conductors are electrically connected to the selector switch, wherein the selector switch is adapted to select via which phase electrical conductor the power is to be received by the electrical load. In another embodiment the system may be adapted to provide DC power via the electrical conductors.

The controlling device may be powered by the power provided by the system. In particular, the controlling device can comprise a power converter and a controller, wherein the power converter can be adapted to convert the power provided by the power distribution system to controller power to be used by the controller, wherein the power converter can be connected via rectifiers to the electrical conductors carrying the different phases. Thus, it may not be necessary to use a local power supply for the controlling device like a battery.

In a further aspect of the present invention an electrical device for being used in a power distribution system as defined in claim 1 is presented, wherein the electrical device comprises:

the electrical load to be powered by the power of the power distribution system, the selector switch for being connected to the several electrical conductors of the power bar and for being connected to the electrical load, wherein the selector switch is adapted to select via which electrical conductor the power is to be received by the electrical load, and the controlling device for controlling the selector switch.

In a further aspect of the present invention a power distribution method for operating a power distribution system as defined in claim 1 is presented, wherein the controlling device controls the selector switch, in order to select via which electrical conductor the power is to be received by the electrical load.

In a further aspect of the present invention a controlling computer program for controlling a power distribution system as defined in claim 1 is presented, wherein the controlling computer program comprising program code means for causing the power distribution system to carry out the steps of the power distribution method as defined in claim 14, when the controlling computer program is run on a computer controlling power distribution system.

It shall be understood that the power distribution system of claim 1, electrical device of claim 13, the power distribution method of claim 14, and the controlling computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
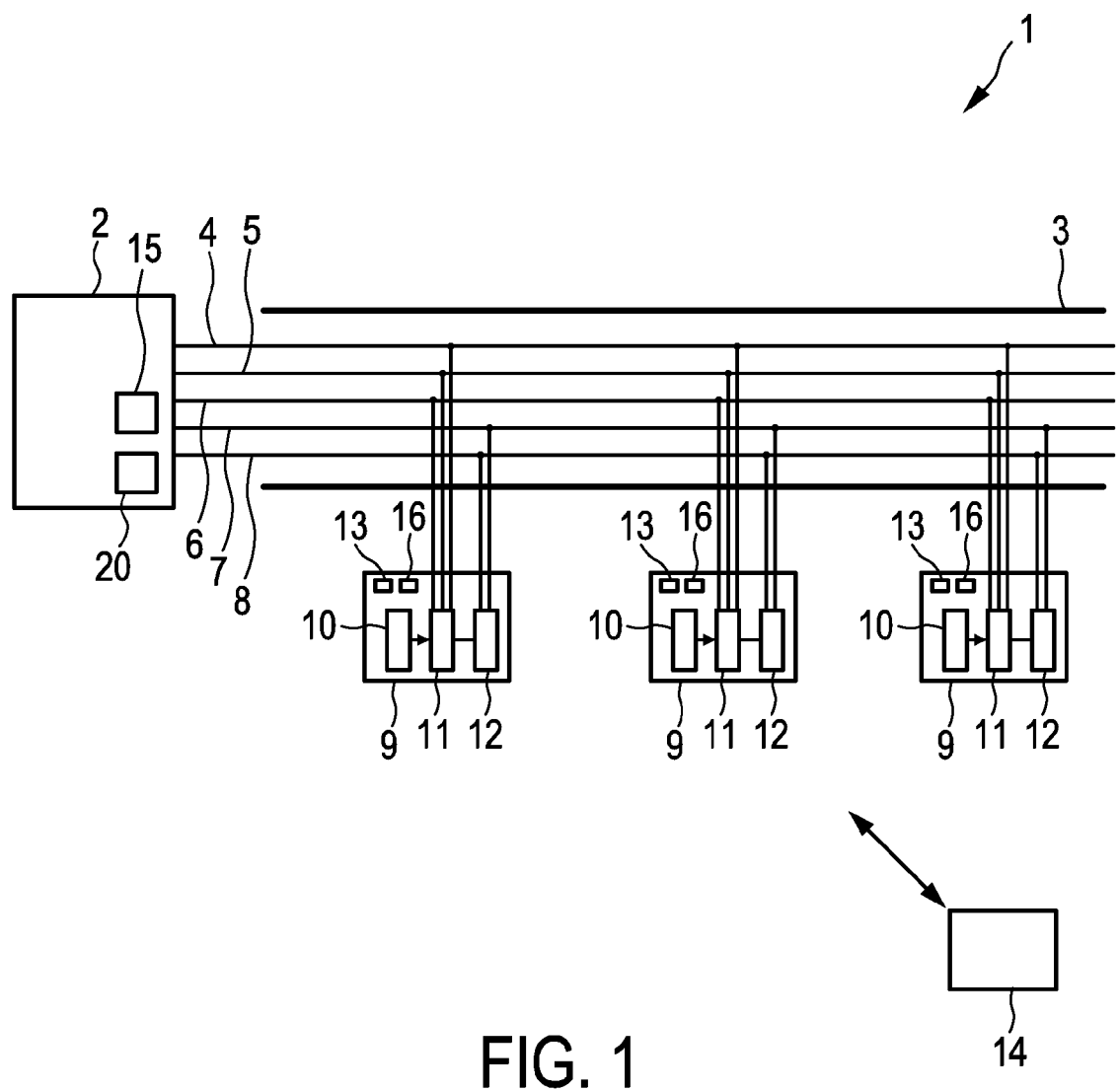
FIG. 1 shows schematically and exemplarily an embodiment of a power distribution system.

FIG. 1 shows schematically and exemplarily an embodiment of a power distribution system. The power distribution system 1 comprises a power supply 2 for supplying power, a bus bar 3 with several electrical conductors 4 . . . 8 and electrical devices 9. In this embodiment the power supply 2 is adapted to provide AC power, wherein each of three phase electrical conductors 4, 5, 6 of the bus bar 3 carries single phase AC power, in particular, three times single phase AC mains is connected to the phase electrical conductors 4, 5, 6. The electrical conductors of the bus bar 3 further include a neutral electrical conductor 7 and a ground electrical conductor 8.

The electrical devices 9 are luminaires, wherein each luminaire comprises a light source 12 including, for instance, a light emitting diode and an electrical driver for driving the light emitting diode, and a selector switch 11 being connected to the phase electrical conductors 4, 5, 6 and to the light source 12, wherein the selector switch 11 is adapted to select via which phase electrical conductor 4, 5, 6 the light source 12 receives the power. Each luminaire 9 further comprises a controlling device 10 for automatically controlling the selector switch 11.

The power distribution system 1 further comprises an electrical conductor power consumption determination unit 20 for determining the power actually consumed on each electrical conductor 4, 5, 6 and electrical load power consumption determination units 13 for determining the actual power consumption of the respective light source 12, wherein the respective controlling device 10 is adapted to select a respective phase electrical conductor 4, 5, 6 for the respective electrical device 9 depending on the actual power consumption of the respective light source 12 and the actual power consumption on the different electrical phase conductors 4, 5, 6. In this embodiment the electrical conductor power consumption determination unit 20 is integrated in the power supply 2. However, in another embodiment the electrical conductor power consumption determination unit 20 can also be a separate unit or can be integrated in another component of the power distribution system, for instance, in a luminaire. The power consumption determination unit 20 is adapted to measure the power consumption on each phase electrical conductor 4, 5, 6. The respective electrical load power consumption determination unit 13, which is preferentially adapted to measure the respective consumed electrical load power, is integrated in the respective electrical device 9.

The power distribution system 1 further comprises an input unit 14 for allowing a user to modify the actual power consumption of the respective light source 12. In this embodiment the input unit is a switch attached to a wall of a room, wherein the switch 14 is adapted to allow a user to separately switch the respective light sources 12 on or off, or to modify the dim level of the respective light source 12. The luminaires 9 and the bus bar 3 are preferentially arranged at the ceiling of the room, wherein the luminaires 9 at the ceiling of the room can be controlled via the switch 14 attached to the wall of the room. In this way a user can modify the actual power consumption of the respective electrical load 12. The switch 14 can be further adapted to allow the user to remotely control the respective controlling device 10, in order to allow the user to select a certain electrical phase conductor 4, 5, 6 via which the power should be received by the respective electrical load 12. In particular, the controlling device 10 of the respective luminaire 9 can be adapted such that it is operable in a first mode, in which the selector switch is automatically controlled, and in a second mode, in which the selector switch is remotely manually controllable via the input unit 14. The respective mode of the controlling device 10 may be selectable by the user via the input unit 14.

The system 1 is adapted such that in an emergency situation the electrical phase conductor 4 is powered. The electrical phase conductor 4 can therefore be regarded as being an emergency electrical conductor. The system 1 further comprises an emergency signal providing unit 15 for providing an emergency signal in case of emergency, wherein the respective controlling device 10 is adapted to select the emergency electrical conductor 4 for powering the respective electrical load 12, if the emergency signal providing unit 15 has provided the emergency signal. In this embodiment the emergency signal providing unit 15 is integrated in the power supply 2 and is adapted to provide the emergency signal, if the user has pressed an emergency button on the input unit 14 or if the user has input that an emergency situation is present in the input unit 14 via another means. The emergency signal providing unit 14 can also be in communication with another unit like an emergency detection unit which may be adapted to automatically detect an emergency situation like a fire by using corresponding sensors like temperature sensors. In particular, the controlling devices 10 of some of the luminaires 9 may be adapted to select the emergency electrical conductor for powering the electrical load, if the emergency signal providing unit has provided the emergency signal, and the controlling device of other luminaires 9 may be adapted to switch off the respective light source, if the emergency signal providing unit has provided the emergency signal, such that not all luminaires 9 provide emergency light during an emergency situation.

The luminaires 9 may further comprise a power measuring unit 16 for measuring the power on the electrical conductor via which the respective electrical load 12 actually receives the power, wherein the respective controlling device 10 can be adapted to select another electrical conductor, if the measured power is smaller than a predefined threshold. Moreover, the respective controlling device 10 may be powered by the power supplied by the power supply 2. In particular, the respective controlling device 10 my comprise a power converter and a controller, wherein the power converter may be adapted to convert the power provided by the power distribution system 1 to controller power to be used by the controller of the controlling device and wherein the power converter may be connected via rectifiers to the phase electrical conductors carrying the different phases. However, the respective controlling device 10 may also comprise a local power source like a battery.

Figure 2:
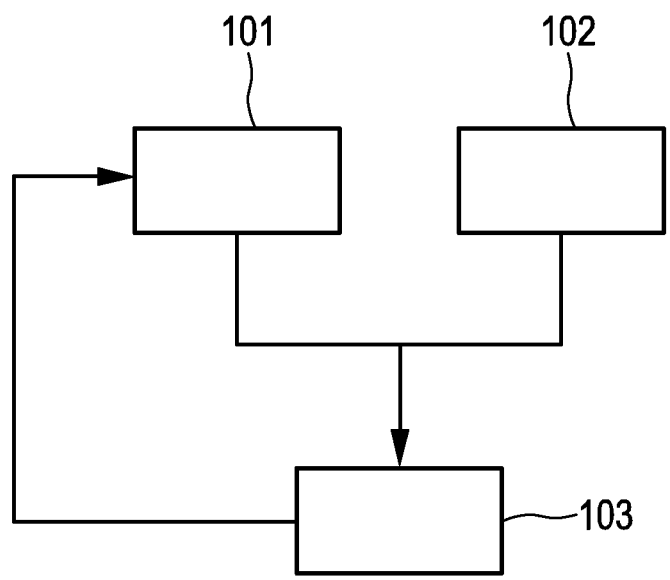
FIG. 2 shows a flowchart exemplarily illustrating an embodiment of a power distribution method.

In the following an embodiment of a power distribution system for operating the power distribution system 1 will exemplarily be described with reference to a flowchart shown in FIG. 2.

In step 101 the electrical conductor power consumption determination unit 20 determines the power actually consumed on each electrical phase conductor 4, 5, 6 and in step 102 the electrical load power consumption determination unit 13 of the respective luminaire 9 determines the actual power consumption of the respective light source 12. In step 103 the controlling device 10 selects an electrical phase conductor 4, 5, 6 via the respective selector switch 11 depending on the actual power consumption of the respective light source 12 and the actual power consumption on the different electrical phase conductors 4, 5, 6. Moreover, in step 103 the respective luminaire 9 may be controlled such that the respective electrical load 12 receives the power via the emergency electrical conductor, if an emergency signal has been provided. Steps 101 to 103 may be performed in a loop such that continuously the power actually consumed on each electrical conductor and the actual power consumption of the respective electrical load 12 are monitored, wherein the selection of the electrical phase conductor 4, 5, 6, via which the respective electrical load 12 receives the power, is made based on the monitored actual power consumptions.

Figure 3:
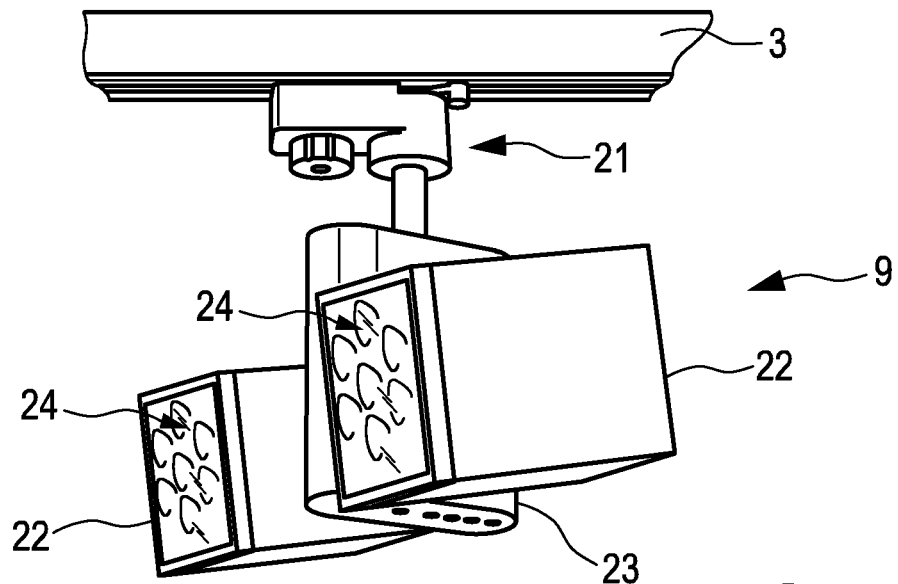
FIG. 3 shows schematically and exemplarily a luminaire of the power distribution system.
Figure 4:
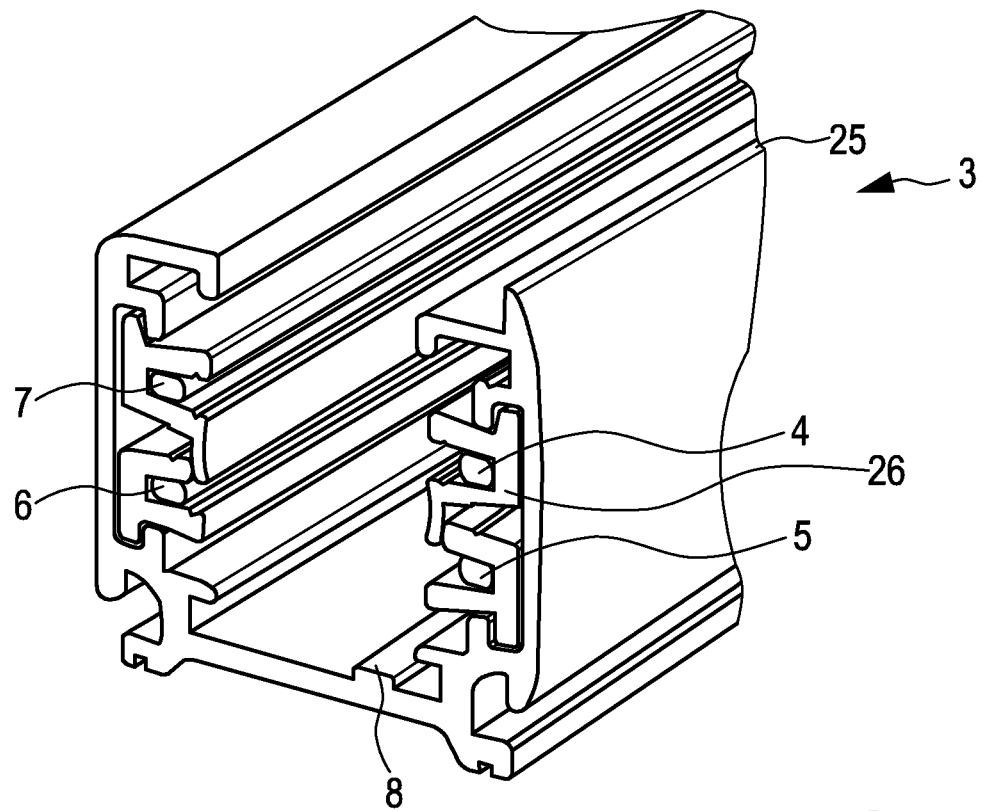
FIG. 4 shows schematically and exemplarily a bus bar of the power distribution system.

The bus bar 3 and the luminaires 9 are preferentially adapted such that the luminaires 9 can be freely placed along the track formed by the bus bar 3. FIGS. 3 and 4 schematically and exemplarily show a luminaire 9 and the bus bar 3 in more detail.

The luminaire 9 schematically and exemplarily shown in FIG. 3 is attached to the bus bar 3 via a mechanical fixation element 21 and comprises an inner housing 23 and two outer housings 22. The outer housings 22 comprise, in this embodiment, light emitting diodes for generating light, which can leave the outer housings 22 via transparent windows 24. The inner housing 23 comprises other components of the luminaire like an electrical driver for driving the light emitting diodes, a controlling device for controlling a selector switch, the selector switch, et cetera. The inner housing 23 is preferentially rotatable with respect to the fixation element 21 and the outer housings 22 are preferentially rotatable with respect to the inner housing 23, in order to allow a user to direct the light generated by the light emitting diodes as desired. The bus bar 3, which is schematically and exemplarily shown in more detail in FIG. 4, comprises a carrying element 25, which in cross section is substantially U-shaped and which carries the phase electrical conductors 4, 5, 6, the neutral electrical conductor 7 and the ground electrical conductor 8. The phase electrical conductors 4, 5, 6 and the neutral electrical conductor 7 are, in this embodiment, copper conductors, which are embedded in insulating holding elements 26 mechanically fixed to inner side surfaces of the carrying element 25. The holding elements 26 may be made of plastics and the carrying element 25 may be made of aluminum. Also the ground electrical conductor 8 may be made of aluminum.

The light sources of the luminaires, in particular, the electrical drivers of the light sources, are remotely controllable via the input unit 14, wherein the three available phases are used to distribute the load between the multiple circuits, i.e. between the different electrical phase conductors 4, 5, 6. The luminaires have a selector switch, which may also be regarded as being a rail selector switch, which may be controlled by means of a local processing of the luminaire, in particular, of the light source, by using the respective controlling device. This allows making flexible use of multiple circuits in track lighting, i.e. flexible grouping and/or power balancing. Additionally, the system may be adapted to have integrated also failure mitigation and emergency operation. The respective luminaire can draw current of any of the three available circuits which can be configured on the fly in a live system, especially in order to achieve an optimal distribution of consumed power, particularly of consumed current. Monitoring means like the electrical conductor power consumption determination unit can observe the maximum allowed current per circuit, i.e. per electrical phase conductor, wherein additional loads can be swapped to a different one.

The different components of the power distribution system can communicate with each other by using known communication systems like power line communication (PLC), infrared (IR) communication, radio frequency (RF) communication, et cetera. For instance, the components connected to the electrical conductors of the bus bar 3 like the components of the electrical devices 9 and of the power supply 2, for instance, the controlling devices 10, the electrical conductor power consumption determination unit 20, the emergency signal providing unit 15, et cetera, can be adapted to communicate with each other via PLC or via another communication system. The input unit 14 may be adapted to communicate with other components of the power distribution system 1 via a wireless communication system like RF or IR communication. If components of the power distribution system communicate by using PLC, the components are preferentially adapted to use the correct phases for the respective PLC signal or to modulate the PLC signal on all phases in parallel.

The luminaires 9 are preferentially adapted such that, whenever the respective luminaire is connected to the bus bar 3, the respective light source 12 is directly connected through related connector contacts to the neutral electrical conductor 7 and the ground electrical conductor 8, i.e. to earth. Moreover, all three circuits, i.e. the three phase electrical conductors 4, 5, 6, get connected at once with the selector switch 11, which might be a mux and which is controlled by the controlling device 10 which preferentially comprises a microcontroller. Control lines are directly provided from the controlling device 10 to the electronic switch 11.

The controlling device, in particular, a microcontroller of the controlling device, is preferentially a low power device, which might start on any of the phases. For instance, the controlling device may comprise an auxiliary supply converter which generates the supply for the microcontroller, wherein diodes may be installed from all three circuits towards the auxiliary supply converter. After a proper phase has been selected by using the controlling device, this information can be kept inside a long time storage memory like an eeprom or a flash memory such that this information will be available after power cycling of the system.

Although in above described embodiments the components for allowing the power balance are distributed in a certain way over the electrical devices 9 and the power supply 2, in other embodiments these components, which form a control system, can be distributed in another way, wherein the control system still keeps track of the power load on the single circuits, i.e. on the single electrical phase conductors, and commands the light sources such that the load between the different circuits is balanced. For instance, only a single electrical device 9 can comprise a corresponding microcontroller and a corresponding measuring unit for measuring the power load on the different circuits, wherein the microcontroller can be adapted to send signals to the other electrical devices for controlling the power consumption of the other electrical devices depending on the power load actually measured on the single circuits. Thus, a microcontroller might be stuck inside a luminaire and a data channel like a PLC data channel might be used to communicate towards any luminaire in the network which phase is to be used.

The power distribution system is preferentially adapted to provide emergency lighting and fail-save operation keeping a minimal number of luminaires on, even if one circuit fails. For this reason one of the phases, i.e. one of the electrical phase conductors, is preferentially reserved for emergency supply, wherein the luminaires get commanded to connect there, if they are supposed to work under emergency conditions. Moreover, for the fail-save operation dependable light can be achieved, because the light sources are allowed to jump to a powered phase, if they lose power.

The power distribution system can be a lighting system, which may be used in offices, in shops or in other locations. For instance, the luminaires may be lamps connected to tracks like spot lamps in shops. The power distribution system may also be adapted to provide trunk lighting installations.

Although in above described embodiments the power supply is adapted to provide three times single phase AC power, in other embodiments the power supply can also be adapted to provide single phase AC power two times or more than three times. Moreover, the power supply can also be adapted to provide multiple phases AC power, wherein the different phases are phase shifted. For instance, the power supply can be adapted to provide three phases AC power, wherein the different phases are shifted by 120 degrees. Furthermore, the power supply may be adapted to provide DC power via the different electrical conductors.

The controlling device can be adapted to select the electrical conductor, from which the respective electrical load should receive the power, based on measured actual power consumptions on the electrical conductors such that the power consumption ratio between the different electrical conductors is within predefined ranges, in particular, such that the power consumption ratio between the different phase electrical conductors is preferentially as close as possible to 1:1:1, if the system comprises three electrical phase conductors. Thus, the controlling device can be adapted to adjust the power consumption ratio between the multiple phases for performing power balancing. The controlling device may comprise a local microcontroller, which may get sourced from any of the phases.

The power supply may be adapted to supply main power in normal situations and emergency power, which is lower than the main power, in emergency situations, wherein one or several circuits, i.e. one or several electrical conductors, can be reserved for emergency power, wherein at least one of the luminaires can be pre-programmed such that they switch to these circuits, when the main power is lost.

If the power supply is adapted to provide DC power, the power level on the respective electrical conductor is preferentially limited by a maximally allowed current on the respective electrical conductor. If the maximum power level has been reached, the respective electrical load may receive the power via another electrical conductor, in order to provide power balancing.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit or device may fulfill the functions of several items recited in the claims. The mere fact that certain measures are recited in mutually different dependent claims does not indicate that a combination of these measures cannot be used to advantage.

Procedures like the selection of the respective electrical conductor, the controlling of the selector switch, the determination of the power actually consumed on each electrical conductor, the determination of the actual power consumption of the electrical load, et cetera, performed by one or several units or devices can be performed by any other number of units or devices. These procedures and the control of the power distribution system in accordance with the power distribution system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates a power distribution system like a track lighting system comprising a power supply for supplying power, a power bar comprising several electrical conductors for distributing the power, an electrical load to be powered by the power of the power distribution system, a selector switch connected to the several electrical conductors and to the electrical load, wherein the selector switch is adapted to select via which electrical conductor the power is to be received by the electrical load, and a controlling device for automatically controlling the selector switch. This kind of power distribution system provides a relatively large variability of adapting the power consumption to an actual load situation, which can lead to an improved performance of the power distribution system. In particular, power balancing can be provided in a relatively simple way by automatically controlling the selector switch accordingly.

The invention claimed is:

1. A power distribution system comprising:
a power supply for supplying power;
a power bar comprising a plurality of electrical conductors for distributing the supplied power;
an electrical load powered by the supplied power of the power distribution system;
a selector switch connected to the plurality of electrical conductors of the power bar and to the electrical load, wherein the selector switch is configured to switch between the plurality of electrical conductors and select via which electrical conductor of the plurality of electrical conductors the supplied power is received by the electrical load; and
a controlling device for automatically controlling the selector switch, wherein the controlling is configured to permit each of the plurality of electrical conductors to transmit respective power simultaneously.

2. The system of claim 1, wherein the system further comprises an electrical conductor power consumption determination unit for determining power actually consumed on each electrical conductor of the plurality of electrical conductors, wherein the controlling device is adapted to select an electrical conductor of the plurality of electrical conductors, via which the supplied power is received by the electrical load, based on the determined actual power consumptions on the plurality of electrical conductors.

3. The system of claim 2, wherein the system further comprises an electrical load power consumption determination unit for determining actual power consumption of the electrical load, wherein the controlling device is adapted to select the electrical conductor, via which the supplied power is received by the electrical load, depending on the actual power consumption of the electrical load and the actual power consumptions on the plurality of electrical conductors.

4. The system of claim 3, wherein the system further comprises an input unit allowing a user to modify the actual power consumption of the electrical load.

5. The system of claim 1, wherein the controlling device is remotely controllable by a user, in order to allow the user to select a certain electrical conductor of the plurality of electrical conductors via which the supplied power is received by the electrical load.

6. The system of claim 1, wherein at least one of the plurality of electrical conductors is an emergency electrical conductor powered in an emergency situation, wherein the system further comprises an emergency signal providing unit for providing an emergency signal in case of emergency, wherein the controlling device is adapted to select the emergency electrical conductor for powering the electrical load, if the emergency signal providing unit has provided the emergency signal.

7. The system of claim 1, wherein the system comprises a power measuring unit for measuring power on an electrical conductor of the plurality of electrical conductors via which the supplied power is received by the electrical load, wherein the controlling device is adapted to select another electrical conductor of the plurality of electrical conductors to transmit the supplied power to the electrical load, if the measured power is lower than a predefined threshold.

8. The system of claim 1, wherein the system is adapted to provide AC power via the plurality of conductors, wherein at least two different electrical conductors of the plurality of electrical conductors each carry single phase AC power.

9. The system of claim 8, wherein the system comprises a neutral electrical conductor and a ground electrical conductor, wherein the neutral electrical conductor and the ground electrical conductor are electrically connected to the electrical load and the at least two different electrical conductors are electrically connected to the selector switch, wherein the selector switch is adapted to select via which of the at least two different electrical conductors the supplied power is received by the electrical load.

10. The system of claim 1, wherein the controlling device is powered by the power supply.

11. The system of claim 1, wherein the system is adapted to provide DC power via the electrical conductors.

12. The system of claim 1, wherein the electrical load is a light source.

13. The system of claim 1, wherein the controlling is based on both measured amounts of the respective power transmitted on each of the plurality of electrical conductors and on measured actual power consumption of the electrical load, which is distinct form the measured amounts of the respective power transmitted.

14. An electrical device for a power distribution system, wherein the electrical device comprises:
an electrical load powered by power supplied by the power distribution system;
a selector switch configured for being connected to a plurality of electrical conductors of a power bar of the power distribution system and for being connected to the electrical load, wherein the selector switch is configured to switch between the plurality of electrical conductors and select via which electrical conductor of the plurality of electrical conductors the supplied power is received by the electrical load; and
a controlling device for controlling the selector switch, wherein the controlling is configured to permit each of the plurality of electrical conductors to transmit respective power simultaneously.

15. The device of claim 14, wherein the controlling is based both on measured amounts of the respective power transmitted on each of the plurality of electrical conductors and on measured actual power consumption of the electrical load, which is distinct form the measured amounts of the respective power transmitted.

16. A power distribution method for operating a power distribution system, the method comprising:
supplying power with a power supply;
distributing the supplied power using a power bar comprising a plurality of electrical conductors;
powering an electrical load by the supplied power;
switching between the plurality of electrical conductors by selecting, via which electrical conductor of the plurality of electrical conductors the supplied power is received by the electrical load, by a selector switch connected to the plurality of electrical conductors of the power bar and to the electrical load; and
automatically controlling the selector switch, wherein the controlling is configured to permit each of the plurality of electrical conductors to transmit respective power simultaneously.

17. The method of claim 16, wherein the controlling is based both on measured amounts of the respective power transmitted on each of the plurality of electrical conductors and on measured actual power consumption of the electrical load, which is distinct form the measured amounts of the respective power transmitted.

18. A non-transitory computer readable medium comprising a computer program for controlling a power distribution system, the computer program comprising program code for causing the power distribution system to perform a power distribution method, the method comprising:
supplying power with a power supply;
distributing the supplied power using a power bar comprising a plurality of electrical conductors;
powering an electrical load by the supplied power;
switching between the plurality of electrical conductors by selecting, via which electrical conductor of the plurality of electrical conductors the supplied power is received by the electrical load, by a selector switch connected to the plurality of electrical conductors of the power bar and to the electrical load; and
automatically controlling the selector switch, wherein the controlling is configured to permit each of the plurality of electrical conductors to transmit respective power simultaneously.

19. The computer readable medium of claim 18, wherein the controlling is based both on measured amounts of the respective power transmitted on each of the plurality of electrical conductors and on measured actual power consumption of the electrical load, which is distinct form the measured amounts of the respective power transmitted.

* * * * *